(12) United States Patent
Wang (10) Patent No.: US 11,493,336 B2
(45) Date of Patent: Nov. 8, 2022

(54) OPTICAL NAVIGATION DEVICE WHICH CAN DETERMINE DIRTINESS LEVEL OF COVER OR FIX MULTI LIGHT PATTERN ISSUE

(71) Applicant: PixArt Imaging Inc., Hsin-Chu (TW)

(72) Inventor: Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 163 days.

(21) Appl. No.: 16/907,329

(22) Filed: Jun. 22, 2020

(65) Prior Publication Data

US 2021/0396514 A1 Dec. 23, 2021

(51) Int. Cl.
| | |
|---|---|
| *G01C 3/02* | (2006.01) |
| *G01C 21/20* | (2006.01) |
| *G01N 21/94* | (2006.01) |
| *A47L 9/00* | (2006.01) |
| *A47L 9/28* | (2006.01) |
| *A47L 11/40* | (2006.01) |

(52) U.S. Cl.
CPC ............... *G01C 3/02* (2013.01); *A47L 9/009* (2013.01); *A47L 9/2805* (2013.01); *A47L 9/2852* (2013.01); *A47L 11/4002* (2013.01); *A47L 11/4011* (2013.01); *A47L 11/4061* (2013.01); *A47L 11/4066* (2013.01); *G01C 21/20* (2013.01); *G01N 21/94* (2013.01); *A47L 2201/04* (2013.01)

(58) Field of Classification Search
CPC ........... G01C 3/02; G01C 21/20; A47L 9/009; A47L 9/2805; A47L 9/2852; A47L 11/4002; A47L 11/4011; A47L 11/4061; A47L 11/4066; A47L 2201/04; A47L 9/30; G01N 21/94; G05D 1/0231
See application file for complete search history.

(56) References Cited

U.S. PATENT DOCUMENTS

| | | | |
|---|---|---|---|
| 7,161,136 B1 * | 1/2007 | Wenstrand | ............ G06F 3/0317 345/157 |
| 9,862,098 B2 | 1/2018 | Zhang | |
| 10,551,843 B2 | 2/2020 | Yee | |
| 2004/0227954 A1 * | 11/2004 | Xie | ...................... G06F 3/03543 356/498 |

(Continued)

FOREIGN PATENT DOCUMENTS

| | | |
|---|---|---|
| CN | 101711353 A | 5/2010 |
| CN | 102121900 A | 7/2011 |

(Continued)

*Primary Examiner* — Richard M Camby
(74) *Attorney, Agent, or Firm* — Winston Hsu (57) ABSTRACT

An optical navigation device comprising: a processing circuit; a first light source, configured to emit first light; a cover; at least one second light source, configured to emit second light toward the cover; and an first optical sensor, configured to sense first optical data generated according to the first light and to sense second optical data generated according to the second light on the cover. The processing circuit determines a dirtiness level of the cover based on the second optical data sensed by the first optical sensor. The optical navigation device can further comprise a second optical sensor. Also, an optical navigation device which can avoid the interference of another optical navigation device is also disclosed.

18 Claims, 11 Drawing Sheets

(56) References Cited

U.S. PATENT DOCUMENTS

| | | |
|---|---|---|
| 2005/0192707 A1 | 9/2005 | Park |
| 2005/0206617 A1* | 9/2005 | Moyer ................. G06F 3/0317 345/163 |
| 2006/0044267 A1* | 3/2006 | Xie ..................... G06F 3/03543 345/157 |
| 2006/0047364 A1 | 3/2006 | Tani |
| 2006/0192761 A1* | 8/2006 | Cheah ................. G06F 3/0317 345/166 |
| 2008/0151233 A1 | 6/2008 | Blanke |
| 2012/0079670 A1 | 4/2012 | Yoon |
| 2012/0247510 A1 | 10/2012 | Chen |
| 2014/0115797 A1 | 5/2014 | Duenne |
| 2014/0124004 A1 | 5/2014 | Rosenstein |
| 2015/0327742 A1 | 11/2015 | Strang |
| 2018/0113517 A1 | 4/2018 | Yang |
| 2018/0289225 A1 | 10/2018 | Izawa |
| 2018/0348373 A1 | 12/2018 | Chen |
| 2019/0128821 A1 | 5/2019 | Yang |
| 2019/0239709 A1 | 8/2019 | Thomas |
| 2020/0107689 A1 | 4/2020 | Yang |
| 2021/0247327 A1* | 8/2021 | Wang .................... G01N 21/94 |

FOREIGN PATENT DOCUMENTS

| | | |
|---|---|---|
| CN | 103443612 A | 12/2013 |
| CN | 106706644 A | 5/2017 |
| CN | 107917918 A | 4/2018 |
| CN | 108663371 A | 10/2018 |
| CN | 110865637 A | 3/2020 |
| EP | 3 367 660 A1 | 8/2018 |
| KR | 10-2011-0124506 A | 11/2011 |
| TW | 200701037 | 1/2007 |
| TW | 201314505 A1 | 4/2013 |

* cited by examiner

High dirtiness level  Low dirtiness level

OPTICAL NAVIGATION DEVICE WHICH CAN DETERMINE DIRTINESS LEVEL OF COVER OR FIX MULTI LIGHT PATTERN ISSUE

BACKGROUND OF THE INVENTION

1. Field of the Invention

The present invention relates to an optical navigation device and a dirtiness level determining method, and particularly relates to an optical navigation device and a dirtiness level determining method which can determine a dirtiness level of a cover in the optical navigation device.

2. Description of the Prior Art

A conventional auto clean machine, such as a robot cleaner, always comprises a cover to protect an image sensor. If the cover is dirty, the navigation function of the auto clean machine may be affected. However, a user always needs to check it frequently or finds the cover is dirty only when the auto clean machine could not smoothly work.

Further, since the auto clean machine becomes more and more popular, more than one auto clean machine may be used in a single house. The auto clean machine always calculates distances between it and furniture or walls near it according to light emitted from the auto clean machine. However, if more than one auto clean machine is close to each other, the light thereof may affect the distance computation of each other.

SUMMARY OF THE INVENTION

Therefore, one objective of the present invention is to provide an optical navigation device which can determine a dirtiness level of a cover thereof.

Another objective of the present invention is to provide an optical navigation device which can avoid the interference of another auto clean machine.

One embodiment of the present invention is to provide an optical navigation device, comprising: a processing circuit; a first light source, configured to emit first light; a cover; at least one second light source, configured to emit second light toward the cover; and an first optical sensor, configured to sense first optical data generated according to the first light and to sense second optical data generated according to the second light on the cover. The processing circuit determines a dirtiness level of the cover based on the second optical data sensed by the first optical sensor.

Another embodiment of the present invention discloses an optical navigation device, which comprises: a processing circuit; a first light source, configured to emit first light; a cover; an first optical sensor, configured to sense first optical data generated according to the first light; a second optical sensor, configured to sense the first optical data, wherein the cover is not in a focal plane of the first optical sensor but in a focal plane of the second optical sensor. The processing circuit determines a dirtiness level based on the first optical data sensed by the second optical sensor.

Another embodiment of the present invention discloses an optical navigation device, which comprises: a processing circuit; an optical sensor; a light source, configured to generate a first light pattern. The processing circuit determines whether the optical sensor senses more than one light pattern to generate a multi light flag. The processing circuit calculates a distance between an object and the optical navigation device based on the multi light flag and the first light pattern.

In view of above-mentioned embodiments, the dirtiness level of the cover can be automatically detected. Thus a user does not need to frequently check the dirtiness level or finds the cover is dirty only when the auto clean machine could not smoothly work. Further, in view of the embodiments, the issue of error distance calculation caused by the multi light patterns can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory calculator readable recording medium such as a hard disk, an optical disc or a memory. Furthermore, the term "first", "second", "third" in following descriptions are only for the purpose of distinguishing different one elements, and do not mean the sequence of the elements. For example, a first device and a second device only mean these devices can have the same structure but are different devices.

Further, an auto clean machine such as a robot cleaner is applied as an example for explaining following embodiments. However, the following embodiments can be applied to any other optical navigation device.

Figure 1:
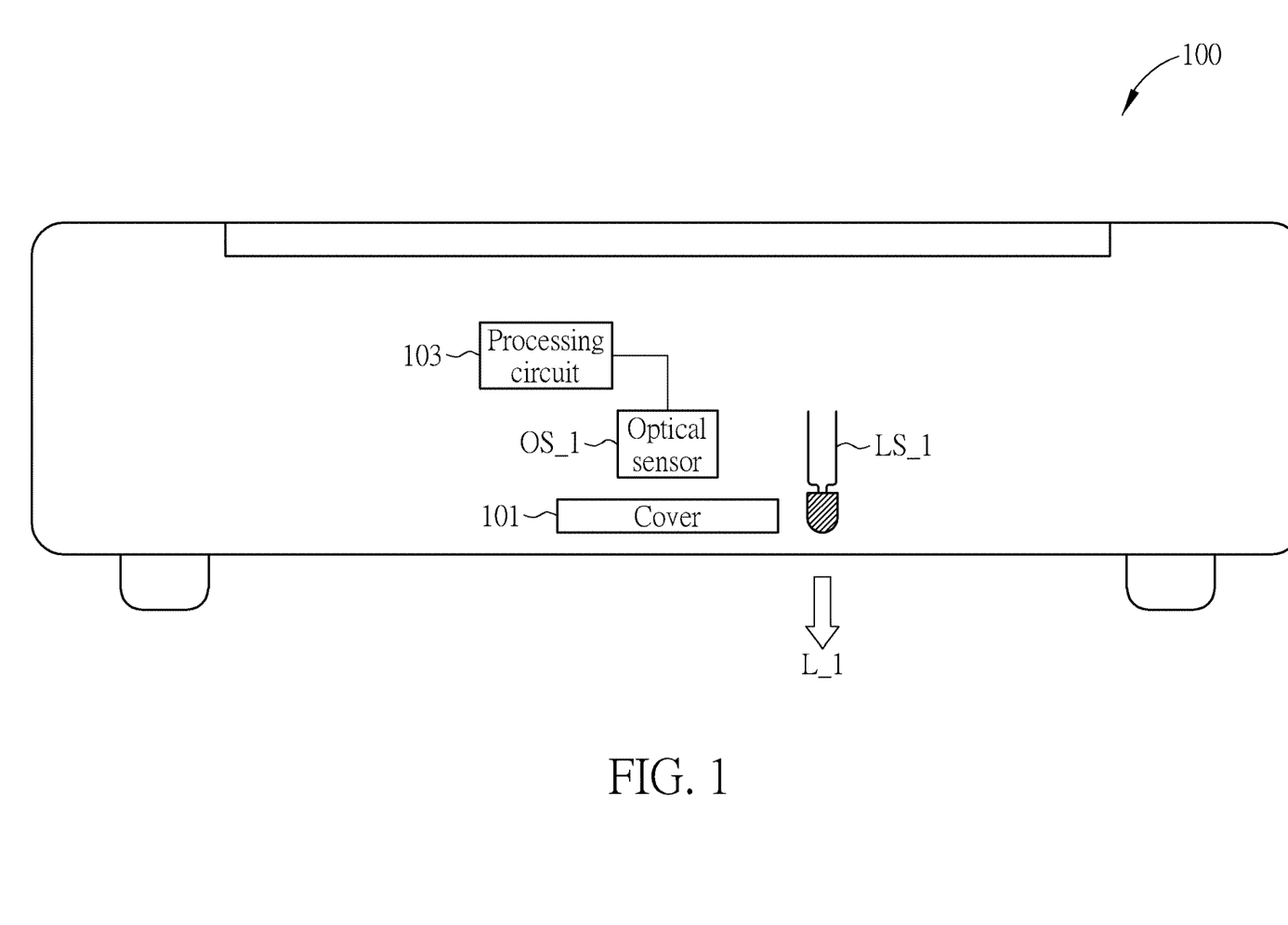
FIG. 1 is a block diagram illustrating an auto clean machine according to one embodiment of the present invention.

FIG. 1 is a block diagram illustrating an auto clean machine 100 according to one embodiment of the present invention. As shown in FIG. 1, the auto clean machine 100 comprises a first optical sensor OS_1, a first light source LS_1, a cover 101, and a processing circuit 103. The first light source LS_1 is configured to emit first light L_1. The first optical sensor OS_1 is configured to sense first optical data (e.g. image or any other optical data comprising optical feature) generated according to the first light L_1. For example, the first light L_1 is emitted to the ground and the first optical data is generated based on the reflected light from the ground. In one embodiment, the processing circuit 103 can determine a location of the auto clean machine 100 based on the first optical data. The processing circuit 103 can be a processor of the auto clean machine 100, thus can also control other operations of the auto clean machine 100. However, the processing circuit 103 can be independent from the processor of the processing circuit 103. The first optical sensor OS_1 can be provided in a container inside the auto clean machine 100, and the cover 101 seals the container. Via such structure, the first optical sensor OS_1 can be prevent from influence caused by ambient light.

The auto clean machine 100 can further comprise at least one second light source different from the first light source LS_1 to help the processing circuit 103 determine a dirtiness level of the cover 101. The second light source LS_2 can have different arrangements (i.e. different locations or different numbers) and are described for more detail in following embodiments. It will be appreciated that the following embodiments are only for explaining and do not mean to limit the scope of the present invention. Any other arrangement which can reach the same function should also fall in the scope of the present invention. Please note, for the convenience of understanding, the auto clean machine 100 and the processing circuit 103 in FIG. 1 are not illustrated in following embodiments.

Figure 2A:
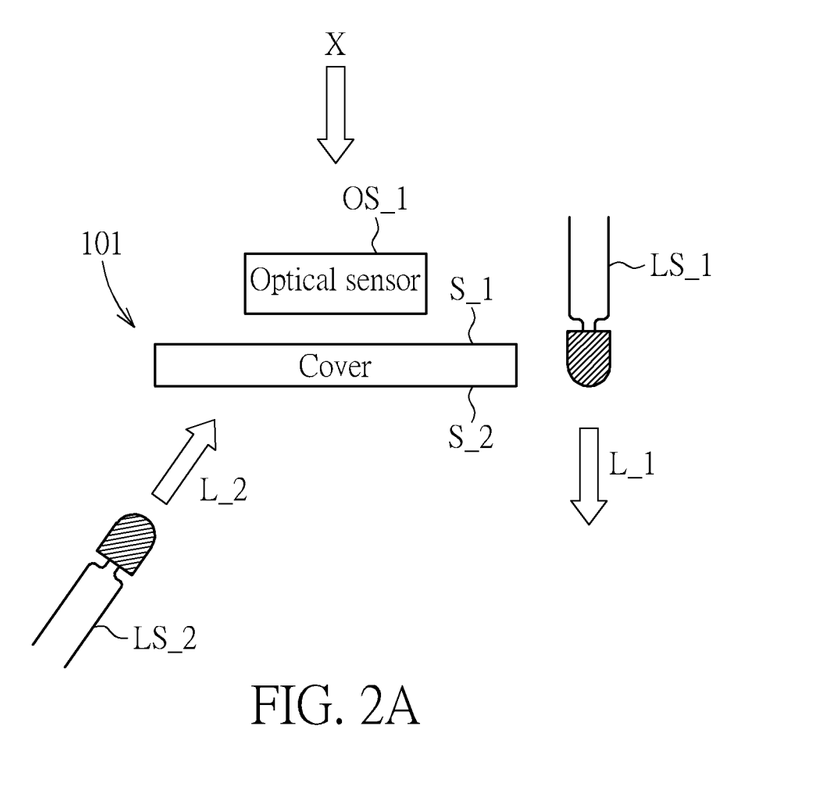
FIG. 2A is a schematic diagram illustrating an arrangement of the second light source according to one embodiment of the present invention.

FIG. 2A is a schematic diagram illustrating an arrangement of the second light source according to one embodiment of the present invention. As illustrated in FIG. 2A, the auto clean machine 100 further comprises a second light source LS_2. The second light source LS_2 is configured to emit second light L_2 toward the cover 101. The processing circuit 103 determines a dirtiness level of the cover 101 based on the second optical data sensed by the first optical sensor OP_1. The determination operation will be described for more details later.

In the embodiment of FIG. 2A, the first optical sensor OS_1 is close to a first side S_1 of the cover 101. Also, the second light source LS_2 is close to a second side S_2 of the cover 101. In other words, a distance between the first optical sensor OS_1 and the first side S_1 is smaller than a distance between the first optical sensor OS_1 and the second side S_2, and a distance between the second light source LS_2 and the first side S_1 is larger than a distance between the second light source LS_2 and the second side S_2.

In such case, the first light source LS_1 emits the first light L_1 toward an outside of the auto clean machine 100 (e.g. downward as shown in FIG. 1), and the second light source LS_2 emits the second light L_2 toward an inside of the auto clean machine 100 (e.g. upward in the embodiment of FIG. 1).

Figure 2B:
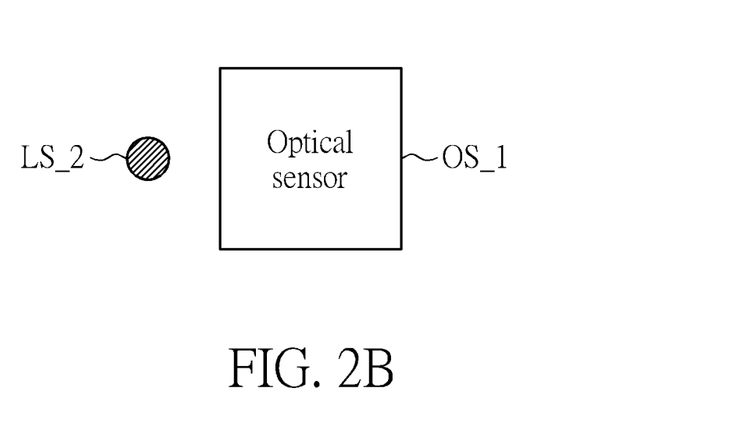
FIG. 2B is a schematic diagram illustrating a top view of the embodiment show in FIG. 2A.

FIG. 2B is a schematic diagram illustrating a top view of the embodiment show in FIG. 2A, which is viewed in the X direction of FIG. 2A. Based on FIG. 2B, it can be clearly understood the relation between the second light source LS_2 and the first optical sensor OS_1.

Figure 3:
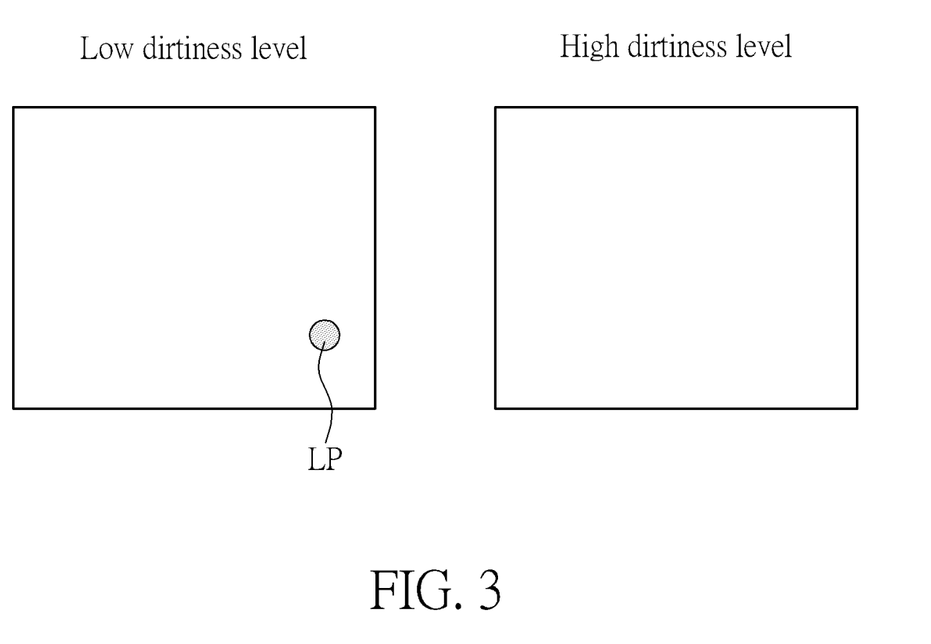
FIG. 3 is a schematic diagram illustrating a cover which has a high dirtiness level and a cover which has a low dirtiness level, according to the embodiment illustrated in FIG. 2A.

FIG. 3 is a schematic diagram illustrating a cover which has a high dirtiness level and a cover which has a low dirtiness level, according to the embodiment illustrated in FIG. 2A. As shown in FIG. 3, if the cover 101 has a low dirtiness level, the light point LP caused by the second light L_2 is clear. On the contrary, if the cover 101 has a high dirtiness level, the light point LP caused by the second light L_2 is blurred or could not be seen on the cover 101. Therefore, the processing circuit 103 can determine the dirtiness level according to the second optical data caused by the second light L_2 on the cover 101.

After determine the dirtiness level, the auto clean machine 100 can generate some informing message indicating the dirtiness level. For example, the auto clean machine 100 can have at least light source to generate the informing message by using different light patterns. Also, the auto clean machine 100 can generate voice informing message indicating the dirtiness level. Besides, the auto clean machine 100 can communicate with a portable electronic device of the user and sends the informing message to the portable electronic device.

Figure 4A:
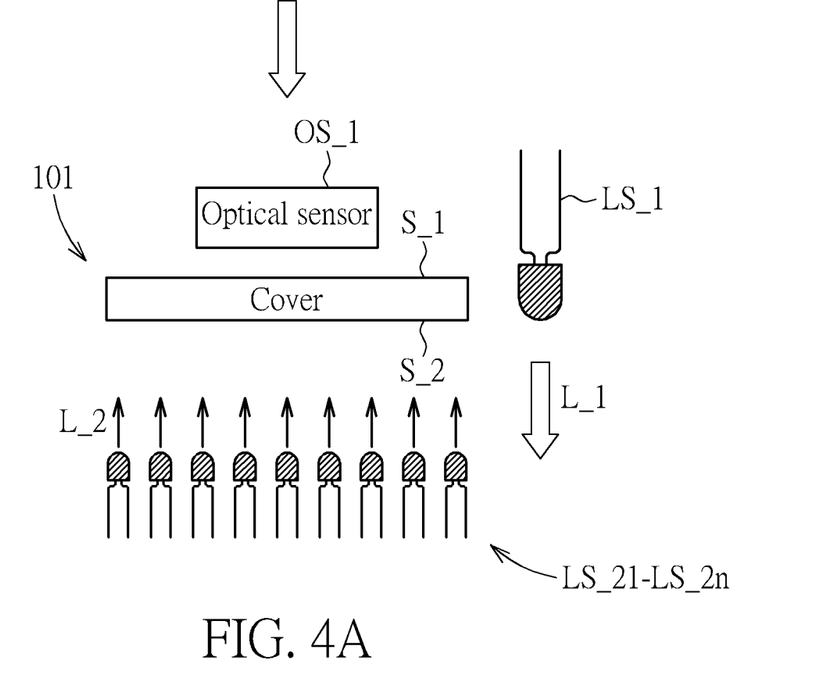
FIG. 4A is a schematic diagram illustrating an arrangement of the second light source according to one embodiment of the present invention.
Figure 4B:
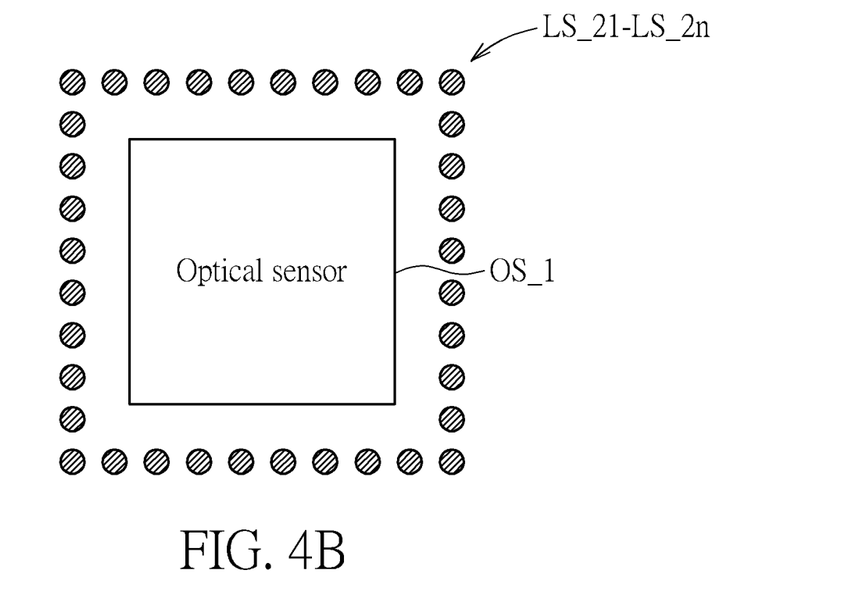
FIG. 4B is a schematic diagram illustrating a top view of the embodiment show in FIG. 4A.
Figure 5:
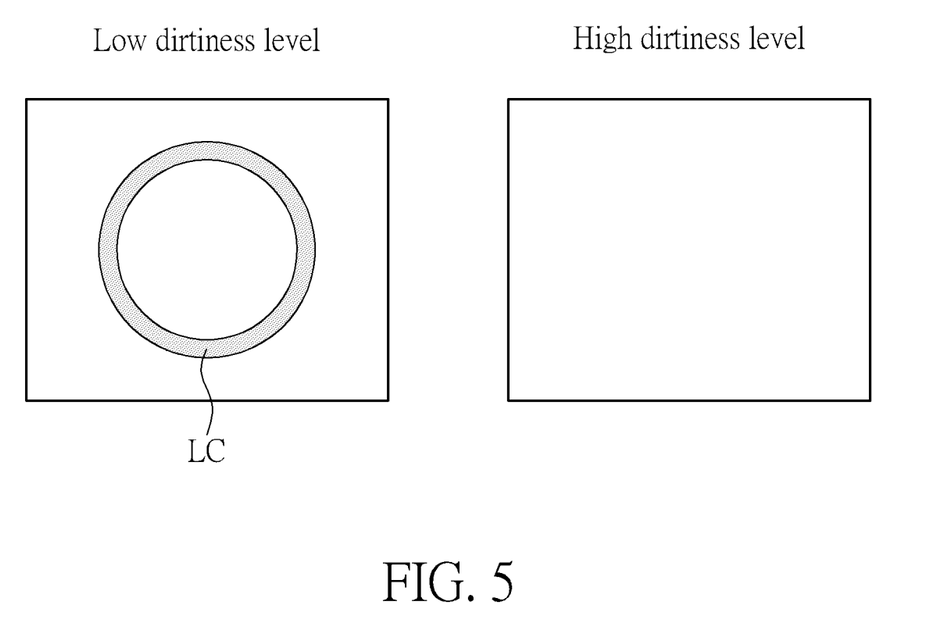
FIG. 5 is a schematic diagram illustrating a cover which has a high dirtiness level and a cover which has a low dirtiness level, according to the embodiment illustrated in FIG. 4A.

The light pattern generated by the second light L_2 is not limited to light point illustrated in FIG. 2A. FIG. 4A is a schematic diagram illustrating an arrangement of the second light source according to another embodiment of the present invention. FIG. 4B is a top view of the embodiment of FIG. 4A, which is viewed in the X direction of FIG. 4A. FIG. 5 is a schematic diagram illustrating a cover which has a high dirtiness level and a cover which has a low dirtiness level, according to the embodiment illustrated in FIG. 4A.

As shown in FIG. 4A and FIG. 4B, a plurality of second light sources LS_21-LS_2n are provided. The first optical sensor OS_1 is close to a first side S_1 of the cover 101. Also, the second light sources LS_21-LS_2n are close to a second side S_2 of the cover 101. In other words, a distance between the first optical sensor OS_1 and the first side S_1 is smaller than a distance between the first optical sensor OS_1 and the second side S_2, and a distance between the second light sources LS_21-LS_2n and the first side S_1 is larger than a distance between the second light sources LS_21-LS_2n and the second side S_2. Additionally, the projection of the second light sources LS_21-LS_2n on the cover 101 is surrounding the first optical sensor OS_1. In one embodiment, the second light sources LS_21-LS_2n can be provided on the sides of the container in which the first optical sensor OS_1 is provided. Also, as above-mentioned, the cover 101 can seal the container.

Therefore, the second light sources LS_21-LS_2n can form a light circle LC shown in FIG. 5. As shown in FIG. 5, if the cover 101 has a low dirtiness level, the light circle LC caused by the second light L_2 is clear. On the contrary, if the cover 101 has a high dirtiness level, the light circle LC caused by the second light L_2 is blurred or could not be seen on the cover 101. Therefore, the processing circuit 103 can determine the dirtiness level according to the second optical data caused by the second light L_2 on the cover 101.

In one embodiment, a storage device in the auto clean machine 100 in FIG. 1 can be applied to store a mapping table which comprises relations between the light patterns generated by the second light L_2 and the dirtiness levels. After the first optical sensor OS_1 acquires the light pattern, the processing circuit 103 can determine the dirtiness level according to the light pattern and the mapping table. For example, if a situation of the light pattern is A (e.g. very clear, clear, blurring, or disappear), the dirtiness level is X. For another example, if a situation of the light pattern is B, the dirtiness level is Y. However, the processing circuit 103 is not limited to determine the dirtiness level by such method.

If the above-mentioned first optical sensor OS_1 is configured to sense reflected light from the ground, the cover 101 may not in the focal plane of the first optical sensor OS_1, thus the first optical sensor OS_1 could not sense clear optical data (e.g. image) of the cover 101. Therefore, one embodiment of the present invention provides another optical sensor to sense optical data of the cover 101.

Figure 6A:
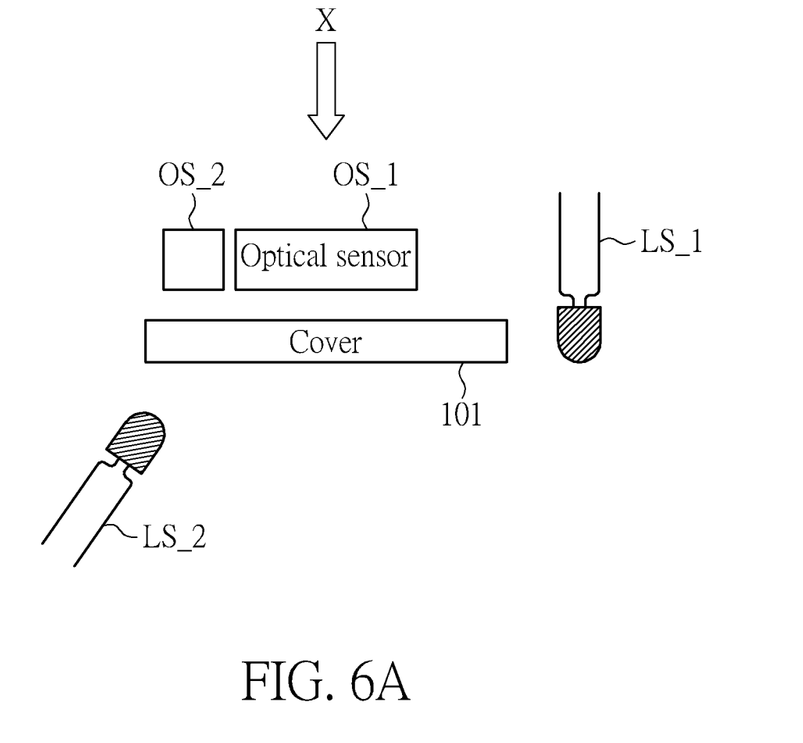
FIG. 6A is a schematic diagram illustrating a second optical sensor according to one embodiment of the present invention.
Figure 6B:
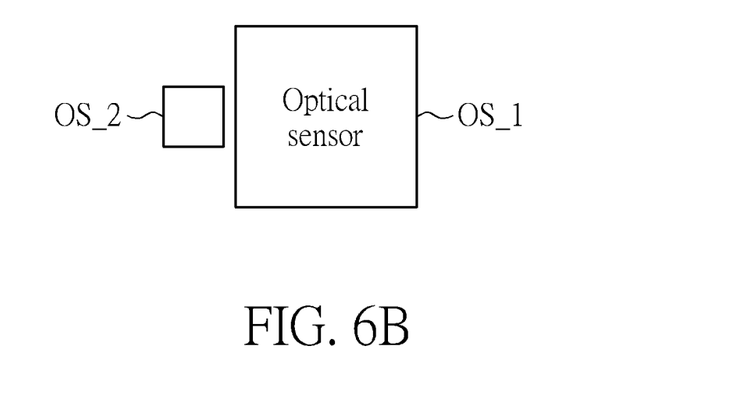
FIG. 6B is a schematic diagram illustrating a top view of the embodiment show in FIG. 6A.

FIG. 6A is a schematic diagram illustrating a second optical sensor according to one embodiment of the present invention. FIG. 6B is a schematic diagram illustrating a top view of the embodiment show in FIG. 6A, which is viewed in the X direction in FIG. 6A. As show in FIG. 6A and FIG. 6B, a second optical sensor OS_2 is provided. The second optical sensor OS_2 is configured to sense the second optical data generated according to second light L_2. The cover 101 is not in a focal plane of the first optical sensor OS_1 but in a focal plane of the second optical sensor OS_2. The processing circuit 103 further determines the dirtiness level based on the second optical data sensed by the second optical sensor OS_2. Also, the processing circuit 103 can determine the dirtiness level only based on the second optical data sensed by the second optical sensor OS_2. Further, in view of FIG. 6B, the relation between locations of the first optical sensor OS_1 and the second optical sensor OS_2 is clearly illustrated.

The second optical sensor OS_2 can be physically independent from the first optical sensor OS_1. That is, the first optical sensor OS_1 and the second optical sensor OS_2 are two different optical sensors. Also, the first optical sensor OS_1 and the second optical sensor OS_2 can be different regions of a single optical sensor.

The second light source LS_2 can but not limited to the second light source in FIG. 2A and the second light source in FIG. 4A. Thus the processing circuit 103 can determine the dirtiness level as shown in FIG. 3 and FIG. 5. However, in one embodiment, the second light source LS_2 can be removed from the embodiment of FIG. 6A. In such case, the second optical sensor OS_2 senses the first optical data generated by the first light L_1 from the first light source LS_1. Thus, in such case, the processing circuit 103 determines the dirtiness level based on the first optical data sensed by the second optical sensor OS_2.

Figure 7:
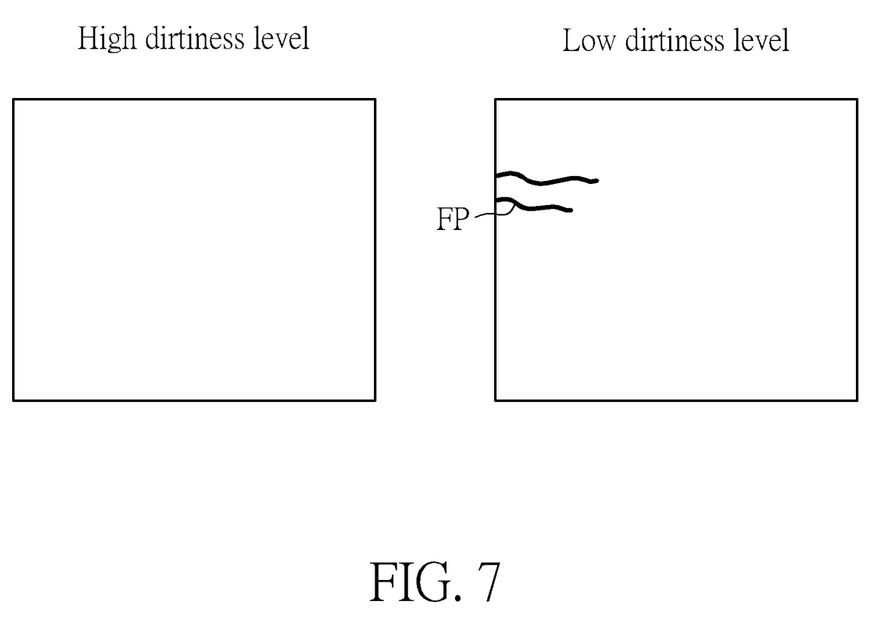
FIG. 7 is a schematic diagram illustrating a cover which has a high dirtiness level and a cover which has a low dirtiness level, in a case that the embodiment illustrated in FIG. 6A does not have the second light source.

FIG. 7 is a schematic diagram illustrating a cover which has a high dirtiness level and a cover which has a low dirtiness level, in a case that the embodiment illustrated in FIG. 6A does not have the second light source LS_2. As shown in FIG. 7, if the cover 101 has a low dirtiness level, some fixed patterns FP thereof may clear show up in the image captured by the second optical sensor OS_2. The fixed patterns may be caused by the textures or scratches on the cover. On the opposite, if the cover 101 has a high dirtiness level, the fixed patterns may be blurred or even disappear. Therefore, the processing circuit 103 can determine the dirtiness level according to the first optical data sensed by the second optical sensor OS_2.

However, since the light source or the material of ground may be different for different auto clean machines, in some cases the first optical data may have results opposite to the embodiment illustrated in FIG. 7. For more detail, due to the type of the light source, the material of the ground, or the material of the cover, or the function of the second optical sensor, in some cases if the cover 101 has a high dirtiness level, some fixed patterns FP thereof may show up in the image captured by the second optical sensor OS_2. On the opposite, if the cover 101 has a low dirtiness level, the fixed patterns may ne blurred or even disappear. Such variation should also fall in the scope of the present invention. Addition, such opposite result may also occur for the embodiments of FIG. 2A and FIG. 4A, due to the same reasons.

In one embodiment, a storage device in the auto clean machine 100 in FIG. 1 can be applied to store a mapping table which comprises relations between the first optical data sensed by the second optical sensor OS_2 and the dirtiness levels. After the second optical sensor OS_2 acquires the first optical data, the processing circuit 103 can determine the dirtiness level according to the first optical data and the mapping table. For example, if a situation of the first optical data is A (e.g. with a very clear fixed pattern, or having no fixed pattern), the dirtiness level is X. For another example, if a situation of the light pattern is B, the dirtiness level is Y. However, the processing circuit 103 is not limited to determine the dirtiness level by such method.

In view of above-mentioned embodiments, the dirtiness level of the cover 101 can be automatically detected. Thus a user does not need to frequently check the dirtiness level or finds the cover 101 is dirty only when the auto clean machine 100 could not smoothly work.

AS above-mentioned, the auto clean machine always calculates distances between it and furniture or walls near it according to light emitted from the auto clean machine. However, if more than one auto clean machine is close to each other, the light thereof may affect the distance computation of each other. Therefore, the present invention also provides a mechanism for solving such issue.

Figure 8:
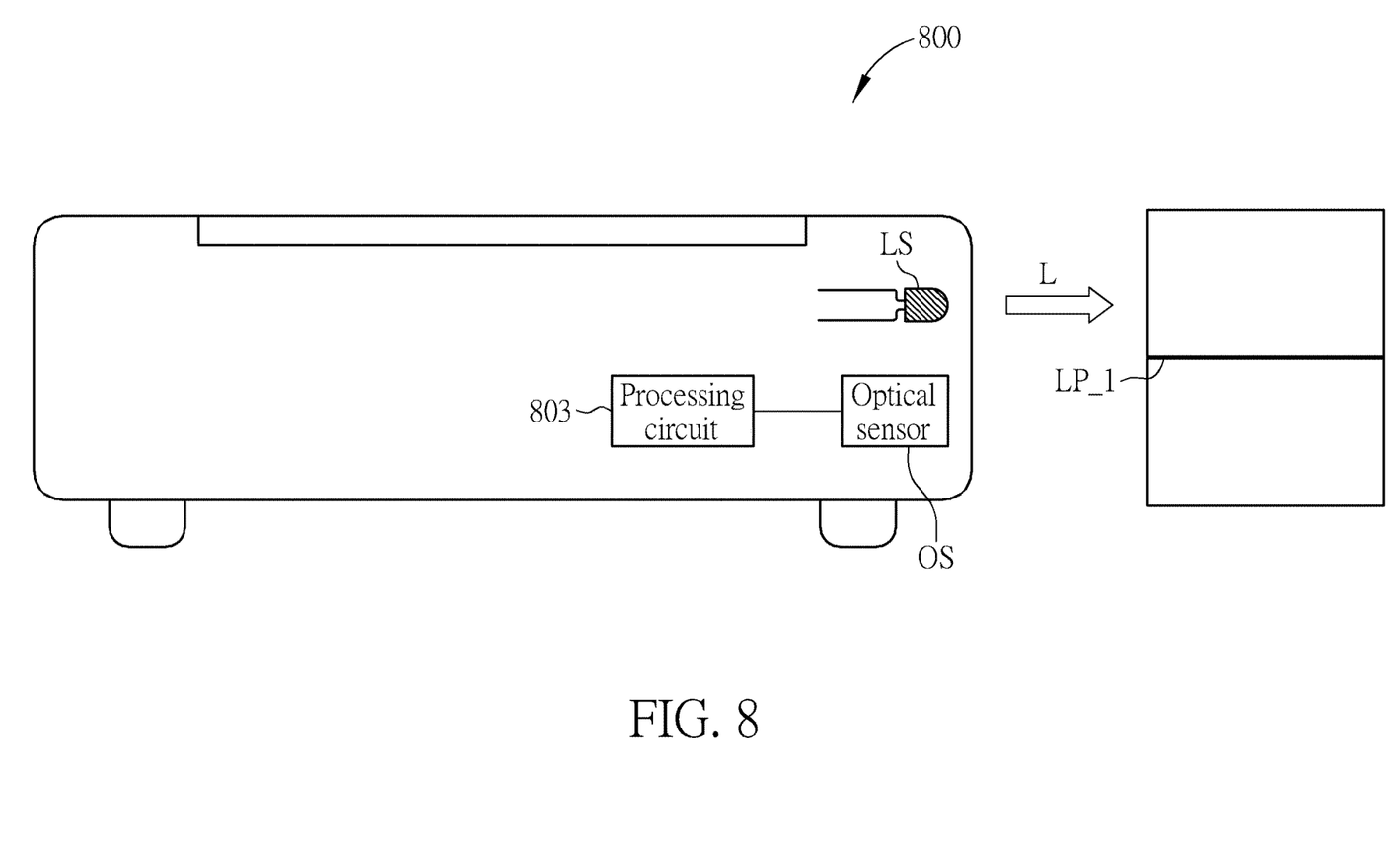
FIG. 8 is a block diagram illustrating an auto clean machine according to one embodiment of the present invention.

FIG. 8 is a block diagram illustrating an auto clean machine according to one embodiment of the present invention. As shown in FIG. 8, the auto clean machine 800 comprises a light source LS, an optical sensor OS and a processing circuit 803. The light source LS is configured to emit light to generate a first light pattern LP_1 on an object (e.g. furniture or a wall). In one embodiment, the light source LS and the light source of another auto clean machine emit structured light, but not limited. The optical sensor OS can sense the first light pattern LP_1. Also, the processing circuit 803 can calculate a distance between the object and the auto clean machine 800 according to the first light pattern LP_1. Further, the processing circuit 803 determines whether the optical sensor OS senses more than one light pattern to generate a multi light flag. The processing circuit 103 further calculates a distance between an object and the optical navigation device based on the multi light flag and the first light pattern LP_1.

Figure 9:
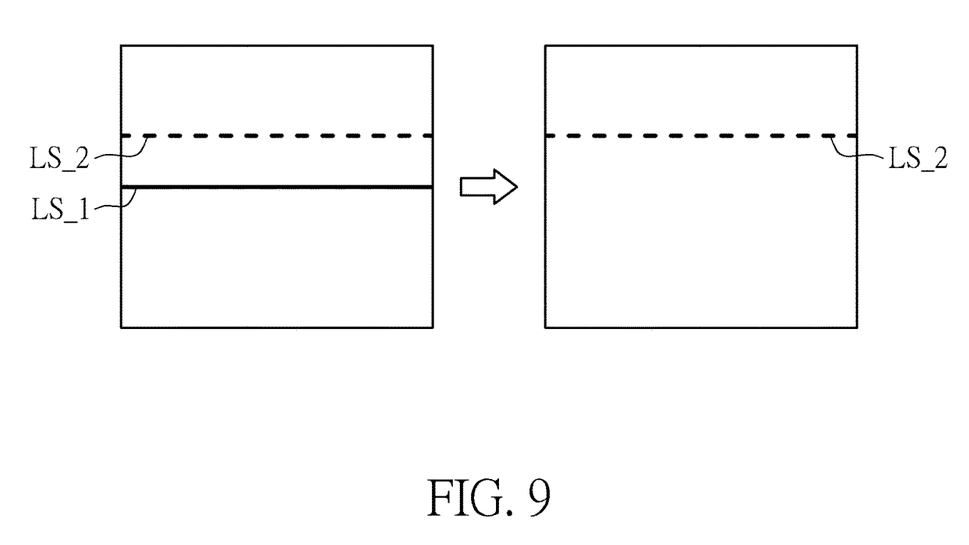
FIG. 9-FIG. 11 are schematic diagrams illustrating the operations of the auto clean machine in FIG. 8 according to different embodiments of the present invention.
Figure 10:
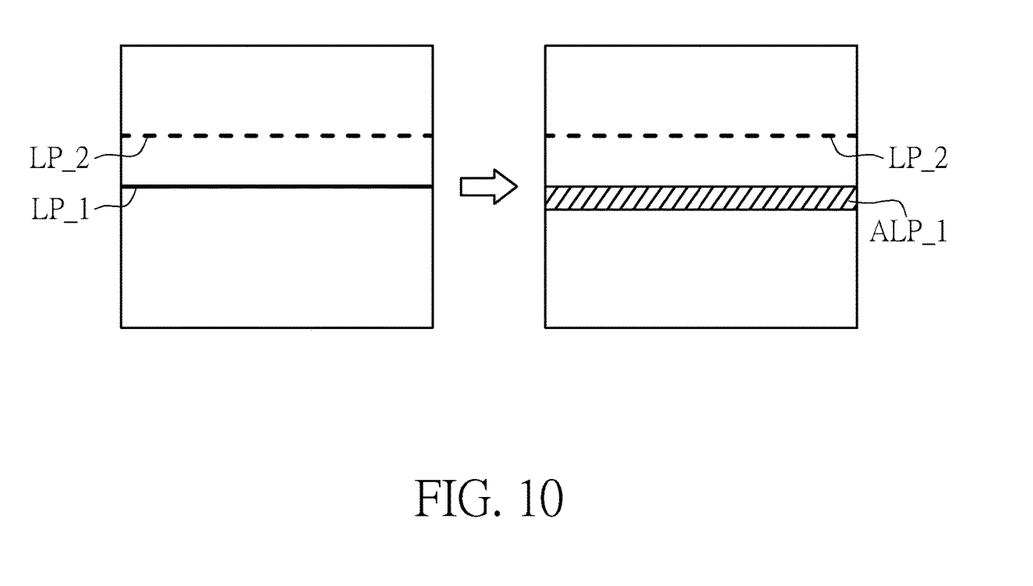
Figure 11:
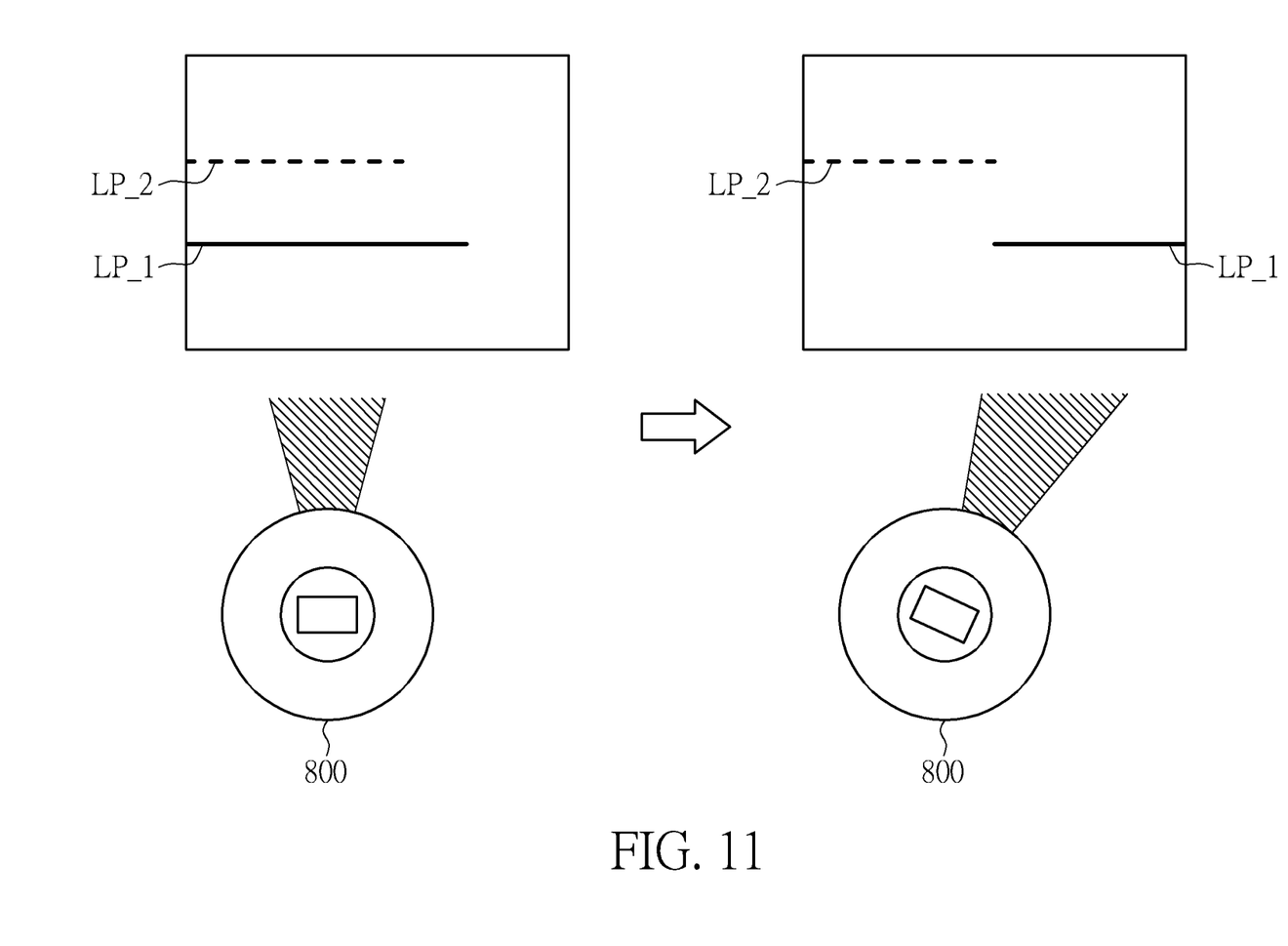

FIG. 9-FIG. 11 are schematic diagrams illustrating the operations of the auto clean machine in FIG. 8 according to different embodiments of the present invention. In following embodiment, two light patterns are taken as examples for explaining. However, the following embodiments can be applied to more than two light patterns.

In the embodiments, the multi light flag may indicate the optical sensor senses more than one light pattern. For example, a first light pattern LP_1 generated by the light source LS and a second light pattern LP_2 generated by another auto clean machine are sensed in the embodiment of FIG. 9. As described above, the first light pattern LP_1 and the second light pattern LP_2 can be not limited to structured light patterns. In such case, the light source LS is turned off, such that the optical sensor OS only senses the second light pattern LP_2. After that, the second light pattern LP_2 is calculated to generate a calculated second light pattern, to acquire a location or other parameters such as brightness of the second light pattern LP_2. Such calculated second light pattern is not shown on the object. After that, turning on the light source LS to generate the first light pattern LP_1 again, and calculates the distance according to the first light pattern LP_1 and the calculated second light pattern. Ideally, the calculated second light pattern is the same as the second light pattern LP_2, thus the processing circuit 103 can know which part of the optical data is the second light pattern LP_2. By this way, the processing circuit 103 can calculate the distance according to the first light pattern LP_1 but not according to the second light pattern LP_2.

In the embodiment of FIG. 10, the light source LS is controlled to generate an adjusted first light pattern ALP_1 if the multi light flag indicates the optical sensor OS senses more than one light pattern. For example, a first light pattern LP_1 generated by the light source LS and a second light pattern LP_2 generated by another auto clean machine are sensed in the embodiment of FIG. 10. Since the first light pattern LP_1 is adjusted to the adjusted first light pattern ALP_1 but the second light pattern LP_2 may be fixed or has only few difference, the adjusted first light pattern ALP_1 and the second light pattern LP_2 can be distinguished from each other. After that, the second light pattern LP_2 is calculated to generate a calculated second light pattern. Such calculated second light pattern is not shown on the object. Afterward, the processing circuit 103 calculates the distance according to the first light pattern LP_1 and calculated second light pattern. Ideally, the calculated second light pattern is the same as the second light pattern LP_2, thus can processing circuit 103 can know which part of the optical data is the second light pattern LP_2. By this way, the processing circuit 103 can calculate the distance according to the first light pattern LP_1 but not according to the second light pattern LP_2.

In the embodiment of FIG. 10, the adjusted first light pattern LP_1 can only be used for distinguishing the second light pattern LP_2 and is not used for calculating the distance. In another embodiment, the distance can be calculated according to the adjusted first light pattern ALP_1 rather than calculated according to the first light pattern LP_1.

In one embodiment, a brightness level of the first light pattern LP_1 is adjusted to generate the adjusted light pattern ALP_1. Also, in another embodiment, an illuminating frequency of the light source LS is adjusted to generate the adjusted first light pattern ALP_1. In other words, the first light pattern LP_1 and the adjusted first light pattern ALP_1 have different bright periods and different dark periods.

Please note the method of generating the adjusted light pattern ALP_1 is not limited to these examples. For example, the shape of the first light pattern LP_1 can be adjusted to generate the adjusted light pattern ALP_1.

In one embodiment, the auto clean machine 800 is rotated if the multi light flag indicates the optical sensor senses more than one light pattern. By this way, the optical sensor OS can only sense the first light pattern LP_1. After that, the distance is calculated according to the first light pattern LP_1. As shown in the left drawing of FIG. 11, the optical sensor OS in the auto clean machine 800 senses the first light pattern LP_1 and the second light pattern LP_2. In such case, the auto clean machine rotates clockwise for predetermined degrees. By this way, in the right drawing of FIG. 11, the optical sensor OS in the auto clean machine 800 can sense the first light pattern LP_1 but does not sense the second light patter LP_2.

In view of the embodiments illustrated in FIG. 8-FIG. 11, the issue of error distance calculation caused by the multi light patterns can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, comprising:
   a processing circuit;
   a first light source, configured to emit first light;
   a cover;
   at least one second light source, configured to emit second light toward the cover; and
   a first optical sensor, configured to sense first optical data generated according to the first light and to sense second optical data generated according to the second light on the cover;
   wherein the processing circuit determines a dirtiness level of the cover based on the second optical data sensed by the first optical sensor;
   wherein the processing circuit determines a location of the optical navigation device based on the first optical data.

2. The optical navigation device of claim 1, wherein the first light source emits the first light toward an outside of the optical navigation device, and the second light source emits the second light toward an inside of the optical navigation device.

3. The optical navigation device of claim 1, wherein the cover comprises a first side and a second side opposite the first side, wherein a distance between the first optical sensor and the first side is smaller than a distance between the first optical sensor and the second side, and a distance between the second light source and the first side is larger than a distance between the second light source and the second side.

4. The optical navigation device of claim 1, further comprising:
   a second optical sensor, configured to sense the second optical data, wherein the cover is not in a focal plane of the first optical sensor but in a focal plane of the second optical sensor;
   wherein the processing circuit determines the dirtiness level based on the second optical data sensed by the second optical sensor and the first optical sensor, or based on the second optical data sensed by the second optical sensor but not based on the second optical data sensed by the first optical sensor.

5. The optical navigation device of claim 1, wherein the second light forms at least one light point or at least one light circle on the cover.

6. The optical navigation device of claim 1, wherein the optical navigation device is an auto clean machine.

7. An optical navigation device, comprising:
   a processing circuit;
   a first light source, configured to emit first light;
   a cover;
   a first optical sensor, configured to sense first optical data generated according to the first light;

a second optical sensor, configured to sense the first optical data, wherein the cover is not in a focal plane of the first optical sensor but in a focal plane of the second optical sensor;

wherein the processing circuit determines a dirtiness level based on the first optical data sensed by the second optical sensor.

8. The optical navigation device of claim 7, wherein the processing circuit determines a location of the optical navigation device based on the first optical data sensed by the first optical sensor.

9. The optical navigation device of claim 7, wherein the optical navigation device is an auto clean machine.

10. An optical navigation device, comprising:
a processing circuit;
an optical sensor;
a light source, configured to generate a first light pattern;
wherein the processing circuit determines whether the optical sensor senses more than one light pattern to generate a multi light flag;
wherein the processing circuit calculates a distance between an object and the optical navigation device based on the multi light flag and the first light pattern.

11. The optical navigation device of claim 10, wherein the step of control the optical navigation device based on the multi light flag and the first light pattern comprises:
turning off the light source if the multi light flag indicates the optical sensor senses more than one light pattern;
calculating a second light pattern sensed by the optical sensor when the light source is turned off to generate a calculated second light pattern;
turning on the light source; and
calculating the distance according to the first light pattern and the calculated second light pattern.

12. The optical navigation device of claim 10, wherein the step of calculates a distance between an object and the optical navigation device based on the multi light flag comprises:
controlling the light source to generate an adjusted first light pattern if the multi light flag indicates the optical sensor senses more than one light pattern;
distinguishing the adjusted first light pattern and a second light pattern sensed by the optical sensor;
calculating the second light pattern to generate a calculated second light pattern; and
calculating the distance according to the first light pattern and calculated second light pattern.

13. The optical navigation device of claim 12, wherein the step of controlling the light source to generate an adjusted first light pattern comprises at least one of following steps:
adjusting a brightness level of the first light pattern; and
adjusting an illuminating frequency of the light source.

14. The optical navigation device of claim 10, wherein the step of control the optical navigation device based on the multi light flag comprises:
rotating the auto clean machine if the multi light flag indicates the optical sensor senses more than one light pattern, such that the optical sensor does not sense another light pattern except the first light pattern; and
calculating the distance according to the first light pattern.

15. The optical navigation device of claim 10, wherein the light patterns are structured light patterns.

16. An optical navigation device, comprising:
a processing circuit;
a first light source, configured to emit first light;
a cover;
at least one second light source, configured to emit second light toward the cover; and
a first optical sensor, configured to sense first optical data generated according to the first light and to sense second optical data generated according to the second light on the cover;
wherein the processing circuit determines a dirtiness level of the cover based on the second optical data sensed by the first optical sensor;
wherein the first light source emits the first light toward an outside of the optical navigation device, and the second light source emits the second light toward an inside of the optical navigation device.

17. An optical navigation device, comprising:
a processing circuit;
a first light source, configured to emit first light;
a cover;
at least one second light source, configured to emit second light toward the cover; and
a first optical sensor, configured to sense first optical data generated according to the first light and to sense second optical data generated according to the second light on the cover;
wherein the processing circuit determines a dirtiness level of the cover based on the second optical data sensed by the first optical sensor;
wherein the cover comprises a first side and a second side opposite the first side, wherein a distance between the first optical sensor and the first side is smaller than a distance between the first optical sensor and the second side, and a distance between the second light source and the first side is larger than a distance between the second light source and the second side.

18. An optical navigation device, comprising:
a processing circuit;
a first light source, configured to emit first light;
a cover;
at least one second light source, configured to emit second light toward the cover; and
a first optical sensor, configured to sense first optical data generated according to the first light and to sense second optical data generated according to the second light on the cover;
wherein the processing circuit determines a dirtiness level of the cover based on the second optical data sensed by the first optical sensor;
wherein the optical navigation device further comprises:
a second optical sensor, configured to sense the second optical data, wherein the cover is not in a focal plane of the first optical sensor but in a focal plane of the second optical sensor;
wherein the processing circuit determines the dirtiness level based on the second optical data sensed by the second optical sensor and the first optical sensor, or based on the second optical data sensed by the second optical sensor but not based on the second optical data sensed by the first optical sensor.

* * * * *